Jan. 21, 1969   P. L. POWELL   3,422,683

SPEEDOMETER

Filed Jan. 20, 1966

INVENTOR.
Patrick L. Powell.

By Norton Lesser
Attorney

United States Patent Office 3,422,683
Patented Jan. 21, 1969

3,422,683
SPEEDOMETER
Patrick L. Powell, Franklin Park, Ill., assignor to Stewart-Warner Corporation, Chicago, Ill., a corporation of Virginia
Filed Jan. 20, 1966, Ser. No. 521,786
U.S. Cl. 73—496   1 Claim
Int. Cl. G01p 3/46

ABSTRACT OF THE DISCLOSURE

The following specification describes a speedometer in which the indicator spindle carrying the speed cup is supported in spaced bearings independently of the magnet shaft. One bearing is supported on an arm secured to the other bearing support and forms part of a sealed damping chamber at the inner end of the spindle. The inner end of the spindle has vanes for rotation in a damping fluid in the damping chamber one end of which is closed by a thrust bearing for the spindle.

---

The present invention relates generally to a speedometer of the magnetic type and more particularly to damping means for the indicator spindle thereof.

In a magnetic type speedometer, a speed cup, which encircles a rotatable magnet, is secured to a rotatable mounted indicator spindle that carries an indicating pointer. Rotation of the magnet within the speed cup sets up a magnetic field which exerts a force causing the speed cup to revolve to a point where the magnetic force is balanced by the retarding force of a hair spring attached to the indicator spindle.

It is an object of the present invention to provide means for damping the indicator spindle of the speedometer whereby to eliminate undesirable flutter, oscillations and other extraneous movements of the indicator spindle and indicating pointer resulting, for example, from rapid changes of speed or vibrations received by the speedometer.

It is another object of the present invention to provide damping means, as described, which is located at the inner end portion of the indicator spindle. By reason of this arrangement, the damping means may be effectively sealed, binding of the indicator spindle is obviated, and spindle misalignment is accommodated.

Now in order to acquaint those skilled in the art with the manner of constructing and using speedometers incorporating the principles of the present invention, there will be described in connection with the accompanying drawing a preferred embodiment of the invention.

Figure 1:
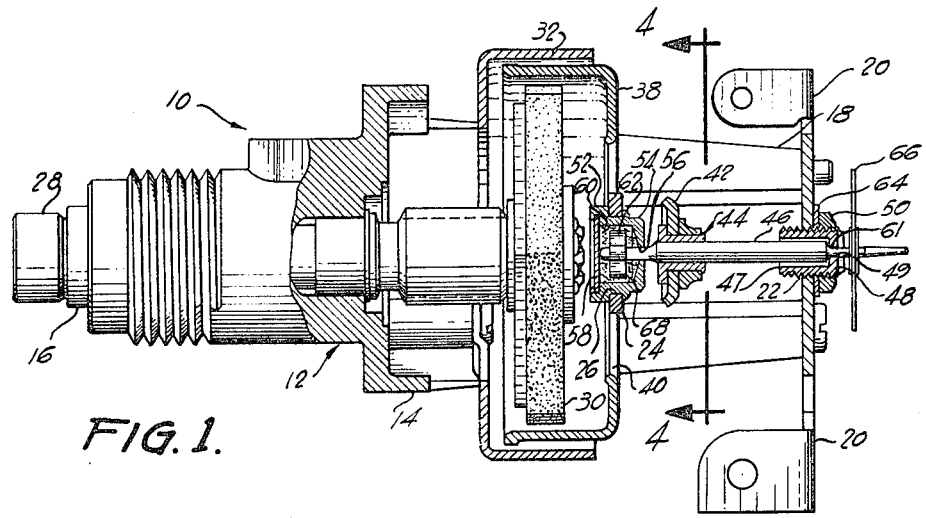
FIGURE 1 is a side elevational view, with portions being broken away and shown in section, of a speedometer incorporating the principles of the present invention.
Figure 2:
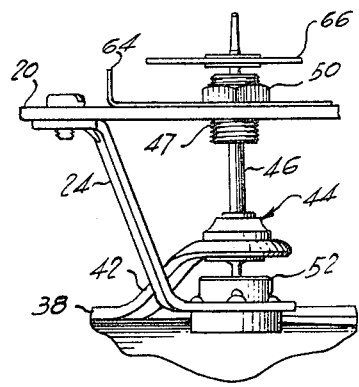
FIGURE 2 is a fragmentary elevational view of the front part of the speedometer of FIGURE 1.
Figure 4:
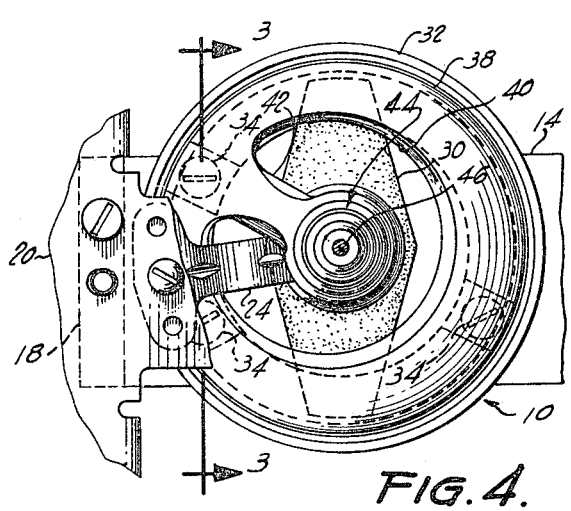
FIGURE 4 is a view taken substantially along the line 4—4 in FIGURE 1, looking in the direction indicated by the arrows.

Referring now to the drawing, there is indicated generally by the reference numeral 10, a speedometer comprising a main frame 12 having a transverse wall portion 14, an axially extending tubular portion 16, and laterally spaced axially extending side arm portions 18. Suitably secured to the ends of the side arm portions 18 is a first support member or plate 20 having a central threaded opening 22 therein. An angularly inwardly extending second support member or bracket 24 at one end is secured to the first support member 20 and at the other end is provided with an opening 26 that is coaxial of the opening 22. The main frame 12 and the first and second support members 20 and 24 define frame means for the speedometer 10.

Figure 3:
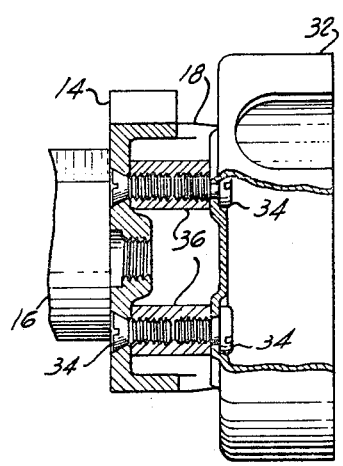
FIGURE 3 is a fragmentary elevational view of the central part of the speedometer of FIGURE 1, with portions being broken away and shown in section.

Rotatably mounted in the tubular portion 16 of the main frame 12 is a magnet shaft 28. The outer end of the magnet shaft 28 is adapted to be connected, for example, to a vehicle transmission through a flexible shaft (not shown). The inner end of the magnet shaft 28 has secured thereon a transverse bar magnet 30 which is surrounded by a field cup 32 secured to the frame wall 14 by means of screws 34 and spacers 36 (FIGURE 3). Encircling the bar magnet 30 within the boundary of the field cup 32 is a speed cup 38 which is fabricated of a non-magnetic material such as aluminum. The speed cup 38 is formed with a central cut-out 40 and with an angular strap portion 42 that is press fitted through bushing means 44 on the intermediate portion of an indicator spindle 46.

The spindle 46 is mounted in the frame means in the following manner. An axially adjustable bearing sleeve 47 is threaded in the opening 22 of the first support member 20. The bearing sleeve 47 has a radial flange 48 with a central aperture 49 therein. A lock nut 50 serves to secure the bearing sleeve 47 in proper axial position. A bearing cap 52 having an annular wall is secured in the opening 26 of the second support member 24. The annular wall of the bearing cap 52 at one side has a radial wall 54 with a central aperture 56 therein and at the other side is closed by a bearing disc 58. The bearing cap 52 and the bearing disc 58 serve to define a chamber 60. The outer and inner end portions of the spindle 46, which are of reduced diameter, are rotatably mounted, respectively, in the bearing sleeve aperture 49 and in the bearing cap aperture 56. The tapered shoulder 61 adjacent the outer end portion of the spindle 46 abuts the bearing sleeve flange 48, while the inner end of the spindle 46 abuts the bearing disc 58. The spindle 46 is thereby axially located in operating position, with the flange 48 and the disc 58 serving as thrust bearings. It will, of course, be appreciated that a slight clearance is provided at the points of abutment to allow free rotation of the spindle 46. The inner end portion of the spindle 46, which extends into the chamber 60, has secured thereon a vaned member 62. This member may, for example, be in the form of a paddle wheel or pinion having a plurality of circumferentially spaced radial vane or tooth portions. The chamber 60 is filled with a viscous damping liquid 68 such as silicone fluid having a viscosity of 150,000 centistokes.

A strip member 64 is interposed between the first support member 20 and the lock nut 50. In a conventional manner, a spiral hair spring 66 is connected at one end to the strip member 64 and at the other end to the indicator spindle 46, while an indicating pointer (not shown) is secured to the outer end of the spindle. During rotation of the magnet shaft 28 and magnet 30, a magnetic field is set up which exerts a magnetic force on the speed cup 38 causing it to revolve in the same direction. The speed cup and indicator spindle 46 rotate to a point where the magnetic force is balanced by the retarding force exerted by the hair spring 66. When rotation of the magnet 30 stops, the speed cup is returned to its rest position by the hair spring 66.

As the indicator spindle 46 revolves, the viscous damping liquid 68 in the bearing chamber 60 produces damping on the vaned member 62 and the indicator spindle 46. By reason of such damping, undesirable flutter of the indicator spindle and indicating pointer, back and forth oscillations of these members when revolving between different speed indicating positions, and other extraneous movements thereof are eliminated. In addition, by locating damping means of the type described at the inner end portion of the indicator spindle 46, spindle misalignment is accommodated and binding thereof is avoided. Also, the particular construction of the damping means affords an effective seal of the damping liquid 68 within the chamber 60. Finally, it will be noted that the speed cup strap 42 is secured to the spindle 46 intermediate of the first and second support members 20 and 24, and that the speed cup 38 encircles a portion of the damping means. This structural arrangement not only permits the damping means to be provided at the inner end of the spindle 46 but also affords a compact construction in an axial direction.

While there has been shown and described a preferred embodiment of the present invention, it will be understood by those skilled in the art that various rearrangements and modifications may be made therein without departing from the spirit and scope of the invention.

I claim:

1. A speedometer for indicating the speed of a moving vehicle comprising first and second separable support members, an indicator spindle having an outer end for carrying a pointer and a shoulder adjacent said outer end, an axially adjustable bearing in said first support member for rotatably supporting said spindle adjacent said outer end and for engaging said shoulder to limit axial movement of said spindle in one direction, a speed cup having a rim, a strap having one end fixed to said spindle intermediate said first support member and the inner spindle end opposite said outer end and extending axially toward said inner end and radially outwardly from said spindle, the other end of said strap fixed to said speed cup for supporting said speed cup adjacent said inenr spindle end with the rim of said cup extending past said inner end, said second support member secured at one end to said first support member and extending toward said spindle inner end, a chamber including an annular wall having radial walls at opposite ends and carried by said second support member at the opposite end of said second support member, one of said radial walls including a bearing for rotatably supporting said spindle adjacent said inner end with said annular wall encircling said inner end, the other radial wall serving as a thrust bearing for said spindle inner end to limit axial movement of said spindle in the opposite direction, a magnet, means mounting said magnet for rotation independently of said spindle within the periphery of said speed cup rim and coaxially with said spindle and speed cup to move said pointer to a position corresponding to the velocity of said magnet with said magnet spaced axially from said inner spindle end, a field cup encircling said speed cup rim, a viscous damping liquid filling said chamber, and axially extending vanes on the inner end of said spindle located within said chamber in concentric relationship to said annular wall encircling said spindle inner end for rotation with said spindle whereby said viscous damping liquid produces damping on said spindle and pointer in response to ambient vibrations transmitted from said support members on movement of said vehicle.

References Cited
UNITED STATES PATENTS

| | | | |
|---|---|---|---|
| 1,068,625 | 7/1913 | Brown | 73—520 XR |
| 1,830,503 | 11/1931 | Berge | 73—520 |
| 1,857,674 | 5/1932 | Zubaty | 73—520 XR |
| 2,569,311 | 9/1951 | Hoare et al. | 73—430 |

JAMES J. GILL, *Primary Examiner.*

U.S. Cl. X.R.

73—519